(12) United States Patent
Sexton et al.

(10) Patent No.: US 7,013,832 B2
(45) Date of Patent: Mar. 21, 2006

(54) ARRANGEMENT FOR DAMPING OF STRUCTURAL RESONANCE

(75) Inventors: David C Sexton, East Witering (GB); Frederick A Johnson, Sevenoaks (GB); Malcolm a Swinbanks, Cambridge (GB)

(73) Assignee: Bae Systems plc, London (GB)

( * ) Notice: Subject to any disclaimer, the term of this patent is extended or adjusted under 35 U.S.C. 154(b) by 0 days.

(21) Appl. No.: 10/258,176

(22) PCT Filed: Apr. 19, 2001

(86) PCT No.: PCT/GB01/01765

§ 371 (c)(1),
(2), (4) Date: Oct. 22, 2002

(87) PCT Pub. No.: WO01/84012

PCT Pub. Date: Nov. 8, 2001

(65) Prior Publication Data

US 2003/0203685 A1  Oct. 30, 2003

(30) Foreign Application Priority Data

Apr. 28, 2000  (GB) .................................. 0010416

(51) Int. Cl.
*F16F 15/02* (2006.01)

(52) U.S. Cl. ...................................... 114/382; 248/638
(58) Field of Classification Search .................... 440/1, 440/52; 267/136, 140.11–140.15, 64.21; 188/378, 379, 266, 267, 266.1, 266.2, 266.7; 248/559, 562, 566, 636, 638; 114/355, 269, 114/382; 181/207–209

See application file for complete search history.

(56) References Cited

U.S. PATENT DOCUMENTS

| 3,481,559 A | * | 12/1969 | Apostolescu ................... 244/2 |
| 4,244,629 A | * | 1/1981 | Habermann ................ 310/90.5 |
| 4,490,841 A |   | 12/1984 | Chaplin et al. |
| 4,635,892 A | * | 1/1987 | Baker ......................... 248/550 |
| 4,795,123 A | * | 1/1989 | Forward et al. ............ 248/550 |
| 4,819,182 A | * | 4/1989 | King et al. ................. 700/280 |
| 4,929,874 A | * | 5/1990 | Mizuno et al. ............. 318/128 |
| 4,999,534 A | * | 3/1991 | Andrianos ................ 310/90.5 |
| 5,022,628 A | * | 6/1991 | Johnson et al. ............ 248/638 |
| 5,049,795 A | * | 9/1991 | Moulds, III ................ 318/561 |
| 5,243,512 A | * | 9/1993 | Putman et al. ............... 700/55 |
| 5,285,995 A | * | 2/1994 | Gonzalez et al. .......... 248/550 |
| 5,291,975 A |   | 3/1994 | Johnson et al. |
| 5,418,858 A |   | 5/1995 | Shoureshi |

(Continued)

FOREIGN PATENT DOCUMENTS

EP  0 821 180  1/1998

(Continued)

Primary Examiner—S. Joseph Morano
Assistant Examiner—Ajay Vasudeva
(74) Attorney, Agent, or Firm—Nixon & Vanderhye P.C.

(57) ABSTRACT

A hull (11) has mounted thereon a number of accelerometers (20) arranged to provide a data signal corresponding to movement or vibration of the hull (11) to which each is fixed. The hull (11) and/or a thrust block (18) has mounted thereon a number of mass dampers (21) that are controlled by a detector (23) arranged between the accelerometers (20) and mass dampers (21). The detector (23) calculates from the data signal generated by the accelerometers (20) different modes of resonance so as to determine the onset of the excitation of a particular resonance mode and controls the mass dampers (21) so as to generate forces to selectively dampen the resonance mode.

16 Claims, 2 Drawing Sheets

U.S. PATENT DOCUMENTS

| | | | |
|---|---|---|---|
| 5,456,341 A * | 10/1995 | Garnjost et al. | 188/378 |
| 5,579,243 A * | 11/1996 | Levine | 708/300 |
| 5,620,068 A * | 4/1997 | Garnjost et al. | 188/378 |
| 5,629,986 A * | 5/1997 | Shoureshi | 381/71.12 |
| 5,713,438 A * | 2/1998 | Rossetti et al. | 188/378 |
| 5,780,948 A | 7/1998 | Lee et al. | |
| 5,802,184 A | 9/1998 | Heath | |
| 5,811,821 A * | 9/1998 | Alexander et al. | 250/440.11 |
| 5,853,144 A * | 12/1998 | Vincent | 244/17.13 |
| 5,883,447 A | 3/1999 | Clausin | |
| 5,920,173 A * | 7/1999 | Mercadal et al. | 318/649 |
| 6,059,274 A * | 5/2000 | Owen et al. | 267/136 |
| 6,116,389 A * | 9/2000 | Allaei | 188/378 |
| 6,137,886 A * | 10/2000 | Shoureshi | 381/71.2 |
| 6,462,927 B1 * | 10/2002 | Swinbanks | 361/146 |
| 6,487,061 B1 * | 11/2002 | Swinbanks et al. | 361/143 |

FOREIGN PATENT DOCUMENTS

| | | | |
|---|---|---|---|
| FR | 2 765 647 A | | 1/1999 |
| GB | 2 255 387 | | 11/1992 |
| GB | 2 281 369 | | 3/1995 |
| GB | 2353873 A | * | 3/2001 |
| JP | 61169386 A | * | 7/1986 |
| JP | 61171686 A | * | 8/1986 |
| JP | 05273989 A | * | 10/1993 |
| JP | 10-138988 | | 5/1998 |
| JP | 10147287 A | * | 6/1998 |

* cited by examiner

ARRANGEMENT FOR DAMPING OF STRUCTURAL RESONANCE

This application is the US national phase of international application PCT/GB01/01765 filed 19 Apr. 2001, which designated the US.

BACKGROUND OF THE INVENTION

1. Field of the Invention

This invention relates to a selective damper system for a structure, in particular to a selective damper system for a marine vessel.

2. Discussion of Prior Art

It is considered conventional in some areas of marine engineering to mount machinery, for example components of a propulsion unit, to a hull portion of the marine vessel through a thrust block such that thrust force generated by the propulsion unit acts on the hull portion through the thrust block to drive the marine vessel in a direction opposite to that in which the thrust force is moving.

However, because the propeller of the propulsion unit used to generate the thrust force is itself acting on turbulent water flowing around the hull of the vessel, the thrust force generated is not steady but comprises fluctuations in the magnitude of thrust force. If the frequency of these fluctuations should coincide with a structural resonance in the vessel, this resonance will be excited and will greatly amplify the thrust force fluctuations thus generating significant noise levels and subjecting the structure of the vessel to substantial stresses.

In addition the machinery in the vessel can also generate fluctuating forces and again, if the frequency of these fluctuating forces coincides with a structural resonance in the vessel, any resonance will be excited and will greatly amplify the force fluctuations, thus generating significant noise levels and subjecting the structure of the vessel to substantial stresses.

The transmission of force fluctuations through the hull of a marine vessel often means that passengers carried by the marine vessel are not able to comfortably occupy certain areas within the vessel. This means that valuable space is lost within the hull of the marine vessel.

One technique for cancelling resonance is to generate an exactly equal and opposite force, i.e. 180 degrees out of phase to the force exciting the resonance and to apply this generated force to the structure to directly cancel the excitation force so as to prevent the resonance being excited.

SUMMARY OF THE INVENTION

The present invention arose during consideration of means to dampen those resonances that otherwise would be excited in order to reduce the associated noise and stress levels in the structure of the marine vessel.

According to the present invention a selective damper system for a structure comprises at least one accelerometer mounted to the structure, each accelerometer being arranged to generate a data signal indicative of local motion of the structure at its mounting position, a detector arranged to receive the data signal from each accelerometer and to generate a control signal in response to at least one resonance being generated in the structure, and at least one mass damper mechanically fixed to the structure and arranged to receive the control signal so as to generate a force to damp the resonance of the structure.

In this manner, resonance vibration generated by a source can be sensed by accelerometers mounted to the structure and a detector can determine a force that a mass damper should create in order to selectively dampen a particular resonance in the structure, such that the system extracts energy from the vibrating structure so as to reduce the amplitude of the resonance. This in effect is making the structure insensitive to excitation of resonance rather than, as in prior art systems, attempting to exactly cancel the forces exciting the resonance. Accordingly, less force may be required to dampen a resonance than the force required to excite the resonance, unlike in prior art systems, wherein the force required to cancel the exciting force must be exactly equal and opposite to the exciting force. It will be understood that in this system possible resonance vibration is detected and a suitable force applied so as to inhibit true resonance actually developing, that is the onset of resonance is detected and inhibited before it grows in amplitude, whereas, in prior art system, true resonance has to occur before an appropriate equal and opposite force can be applied so as to exactly cancel the developed resonance.

Preferably, the structure may be a hull of a marine vessel. In this manner resonances that would otherwise be generated by a propulsion unit carried by the marine vessel can be selectively prevented from building up into significant noise sources. This can be particularly useful in a marine vessel where certain areas of the vessel are not suitable for use by passengers because of excessive resonance generated noise, thereby allowing more use of a marine vessel.

In a system employing a plurality of accelerometers, the accelerometers may be distributed at various locations on the structure. It may be that accelerometers already exist on the structure for another purpose, in which case use of these accelerometers will reduce the need for providing routing paths for electrical connections.

The detector may be arranged to determine at least one mode of resonance of the structure and to generate a control signal when that mode of resonance has been detected. In this manner, the detector can determine which mode of resonance is building up in the structure and apply appropriate control signals to operate each mass damper so as to selectively dampen this particular mode of resonance. Each mass damper may be arranged to generate a force substantially to dampen each mode of resonance.

The detector may comprise a modal matrix decomposition function arranged to identify at least one resonance mode of the structure from the data signal and an inverse modal matrix function to generate an appropriate control signal dependant on each identified resonance mode.

Preferably, the mass damper may comprise a mass supported from a housing that is fixed to the structure and a pair of electromagnets operable to move the mass in an axial direction to generate a reaction force substantially to oppose the vibration of the structure. A diaphragm arrangement may support the mass from the housing.

Each accelerometer may be mounted to the structure in a location to detect the onset of each selected resonance and each mass damper may be mounted to the structure in a location to substantially to damp the motion of each selected resonance mode. The location can be determined in advance of locating each device either using analysis or empirical processes or may be determined once each device is in situ.

BRIEF DESCRIPTION OF THE DRAWINGS

This invention will now be described, by way of example only, with reference to the accompanying drawings, in which.

DETAILED DISCUSSION OF EMBODIMENTS

Figure 1:
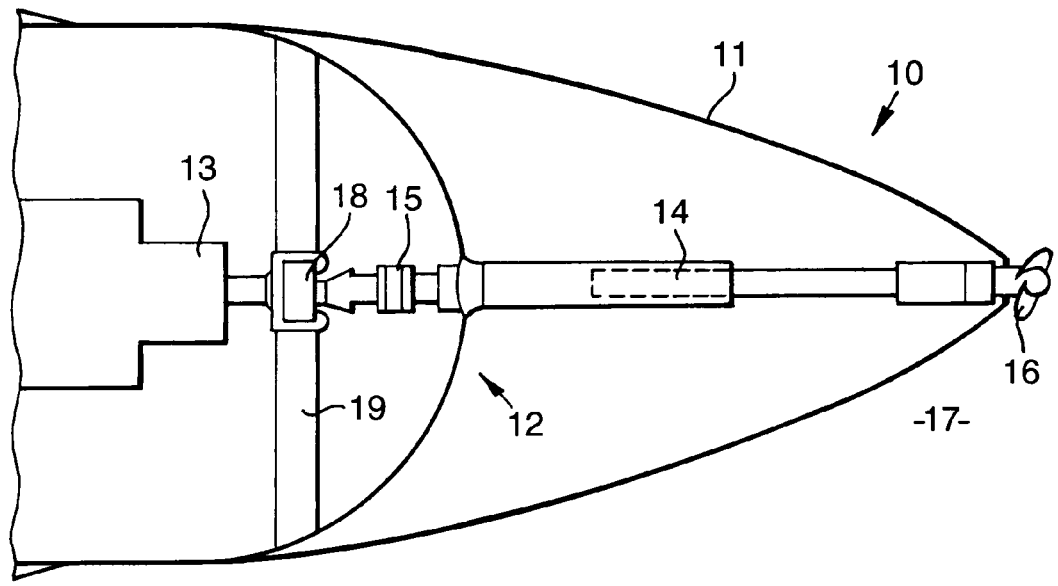
FIG. 1 is a schematic plan view of a hull and propulsion mechanism of a marine vessel incorporating the invention.

In FIG. 1 a marine vessel 10 comprises a hull 11 housing a propulsion unit 12 comprising a drive means 13 arranged to provide power to rotate a propeller shaft 14 through a coupling 15 so as to rotate a propeller 16 in water 17 surrounding the hull 11 of the marine vessel 10. A force generated by action of the propeller 16 through the water 17 is arranged to act through the propeller shaft 14 on a thrust block 18 which is securely mounted to a portion of hull 11 by bulkhead 19. Thereby force created by the propeller 16 acts to move the hull 11 in a direction opposite to that of the generated force.

Figure 2:
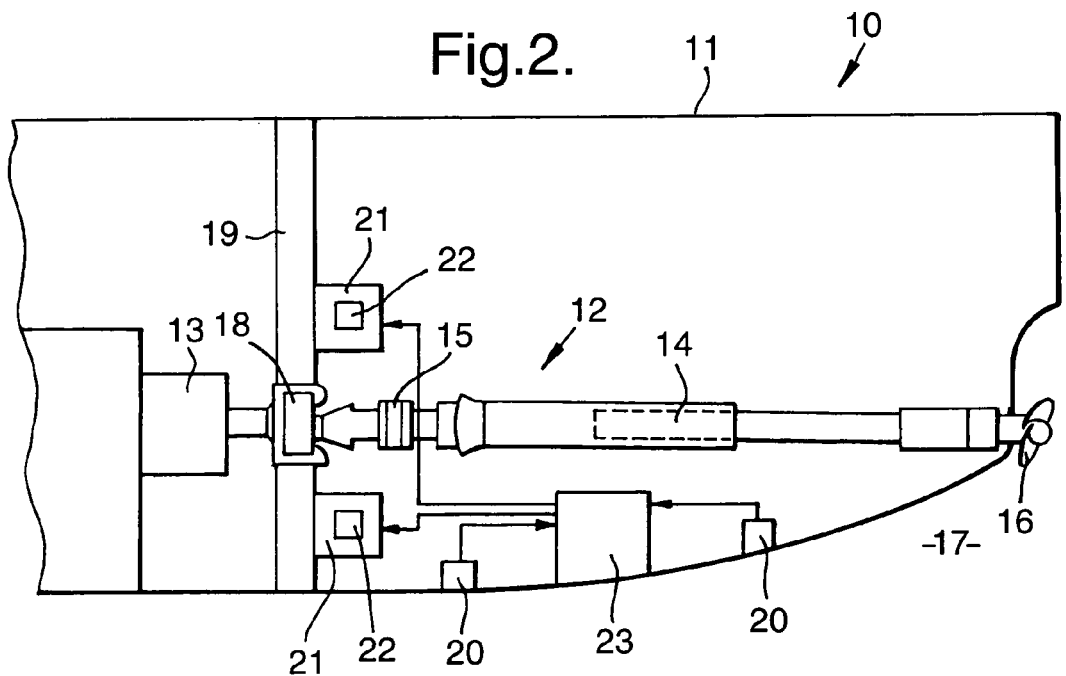
FIG. 2 is a detailed elevation view of FIG. 1.

In FIG. 2, the same references have been used to indicate similar integers to those used in FIG. 1. FIG. 2 illustrates a hull 11 having mounted thereon a number of accelerometers 20 which provide a data signal corresponding to movement or vibration of the hull 11 to which each is fixed. It will be understood that the term accelerometer 20 relates to any sensor which may detect either the motion or the proximity of the structure, in this case the hull 11, to which it is mounted and produce a data signal corresponding to the motion or proximity or change in motion or proximity of the structure to which it is mounted.

The hull 11 and/or thrust block 18 or any other suitable surface has mounted thereon a number of mass dampers 21, which are described in more detail below, but may be electromagnetic shakers. However, as a general description, each mass damper 21 comprises a mass 22 arranged to be moved in a lateral direction in response to a control signal produced by a detector 23 connected between each accelerometers 20 and each mass damper 21. The detector 23 is arranged to create a control signal from a data signal generated by each accelerometer 20. In this manner, resonance created or transmitted by the propeller shaft 14 or any other part of this propulsion unit 12 can be dampened by moving each mass 22 such that its movement dampens the resonance created by the propeller shaft 14 or any other part of the propulsion unit 12 to the hull 11 and/or thrust block 18.

Figure 3:
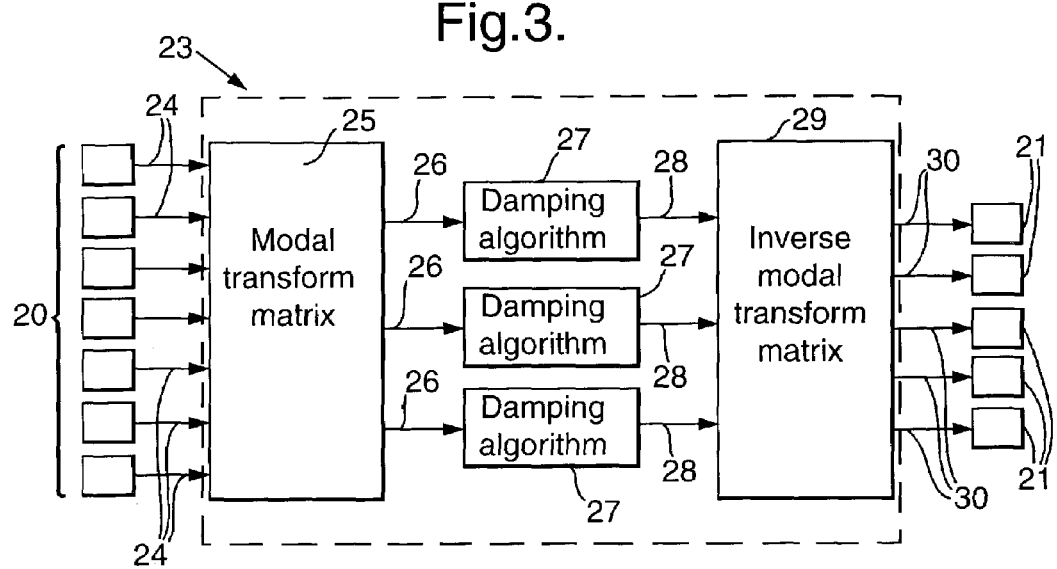
FIG. 3 is a block diagram of a detector comprising modal transform apparatus for converting seven accelerometer inputs into three resonance outputs.

In FIG. 3, the same references have been used to indicate similar integers to those shown in FIGS. 1 and 2. FIG. 3 shows a detector 23 which is located between each accelerometer 20 and each mass damper 21. In this case, an array of seven accelerometers 20, have been distributed about the hull 11 and/or thrust block 18 to calculate three different modes of resonance so as to control five mass dampers 21, which have also been distributed about the hull 11 or thrust block 18. Each accelerometer 20 produces a data signal 24 which is received by a modal transform matrix 25 which calculates the amplitude of different modes of resonance. The modal transform matrix 25 is arranged to produce an excitation output 26 for each mode of resonance to be detected. In effect, the modal transform matrix 25 spatially filters out particular natural resonant modes of the hull 11 and comprises a model of the properties of the hull 11. Each excitation output 26 is used to feed a damping algorithm 27, one for each mode of resonance to be detected, that are arranged to generate a modal control demand force 28.

Each modal control demand force 28 is transformed by an inverse modal transform matrix 29 into actual mass damper demand force control signal 30, which is used to control the mass dampers 21. In effect the inverse modal transform matrix 29 selects the best configuration to dampen a selected resonance. It will be understood that although seven accelerometers are used to provide a data signal 24 to control six mass dampers 21, the numbers of accelerometers 20 or mass dampers 21 may be varied depending on the application and that this in turn effects the size of modal transform matrix 25, the size of inverse modal transform matrix 29, and the number of damping algorithms 27 required.

The construction of modal transform matrix 25, algorithms 27 and inverse modal transform matrix 29 and their coefficients are dependent on the application and may be determined from analysis or empirical methods prior to mounting the accelerometers 20 and mass dampers 21 or once accelerometers 20 and mass dampers 21 have been mounted within the marine vessel 10.

It should be understood that the accelerometers 20 may be fixed to the hull 11 or to any surface in which resonant vibration can build up. It will also be understood that the mass dampers 21 may be mounted on the thrust block 18 or to any surface that the transmission of vibration is required to be dampened. In the case when the marine vessel 10 already has accelerometers 20 distributed about the hull 11 for a different purpose, these accelerometers could be used to determine the different modes of resonance, thereby a saving can be made on the requirement to provide and mount accelerometers 20 to the hull 11 and to provide routing paths for electrical connections between the accelerometer 20 and the detector 24.

Using selective damping the onset of the excitation of a particular resonance mode can be detected and forces can be created immediately and selectively to start damping that resonance mode. This action can prevent a selected resonance mode from building in amplitude.

Since the phase of the control forces can be controlled relative to the excitation of the resonance mode, the damping can be achieved in such a way that there is a reduced or negligible shift in the natural resonant frequency of the mode.

Figure 4:
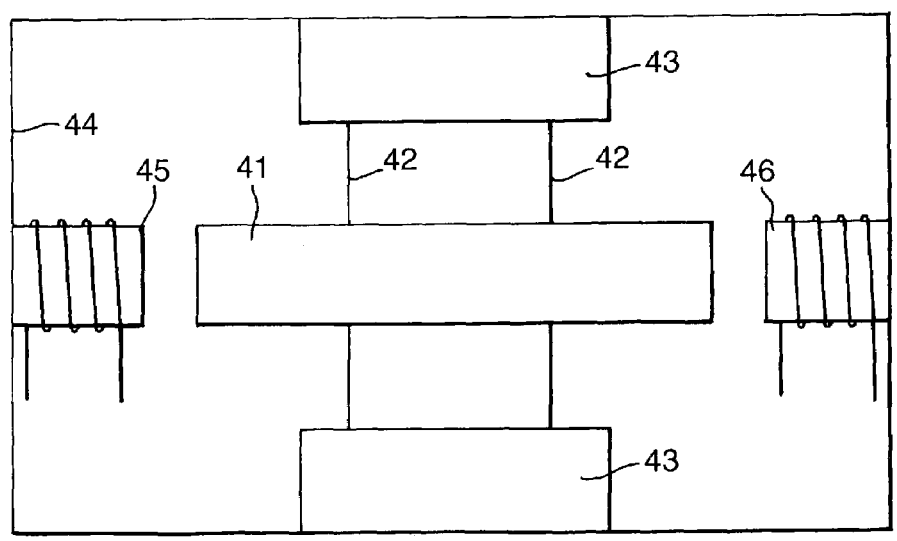
FIG. 4 is a schematic diagram of a mass damper.

FIG. 4 shows a typical mass damper 40 which comprises a mass 41 suspended by a pair of diaphragms 42 between fixing portions 43 of a housing 44. Electromagnets 45 and 46 are arranged at either end of the mass 41 and are operated by control means, not illustrated, to move the mass 41 laterally between the electromagnets 45 and 46. The electromagnets 45 and 46 are also mounted to the housing 44. In operation each electromagnet 45, 46 exerts an attraction force on the mass 41 and by varying the force exerted by each electromagnet 45, 46, using the control means, the mass 41 can be moved in a lateral direction.

The pair of diaphragms 42 serve to suspend the mass 41 between fixing portions 43 and to assist in returning the mass 41 to a central position or to retain the mass 41 in a central position when electromagnets 45, 46 are not in operation. It will be understood that alternative arrangements for mass dampers 40 exist, for example, electromagnets 45, 46 may be substituted with permanent magnets and the mass 41 may comprise an electromagnet arrangement. In this arrangement the control means is arranged to energise the electromagnet so as to move the mass 41 laterally between the permanent magnets.

It will be understood that it is necessary to provide mass dampers 21 arranged in such an orientation so as to oppose a resonance vibration in the structure to which it is attached. Although a lateral type mass damper 21 has been described, it is envisaged that a mass damper may be employed that dampens resonant vibration in the hull 11 in a plurality of directions.

Although the invention has been described with reference to a marine vessel 10, it should be understood that the invention can be applied to any structure in which resonance vibration needs to be dampened. An advantage of using the invention in a large structure is that the force required to dampen a resonance vibration can be less than the force exciting this resonance, thereby smaller devices can be used to dampen resonance vibration in larger structures.

The invention claimed is:

1. A selective damper system for a vibrating structure, said system comprising:
    a plurality of motion sensors for mounting to the structure, each sensor being arranged to generate a data signal indicative of local motion of the structure at its mounting position,
    a detector, responsive to the data signal from each of said sensors, including a modal matrix decomposition function for identifying at least one resonance mode of the structure from said data signals and, responsive to said identified resonance modes, an inverse modal matrix function for generating appropriate control signals in response to the onset of resonant mode vibrations at said at least one resonance mode in the structure, and
    a plurality of electromagnetic shakers mechanically fixed to the structure and arranged to receive the control signals so as to generate forces tending to damp said resonances of the structure.

2. A selective damper system, as in claim 1, including a plurality of damping algorithm means coupled between the modal matrix decomposition function and the inverse modal matrix function.

3. A selective damper system, as in claim 1, wherein each electromagnetic shaker generates a force substantially to dampen each mode of resonance.

4. A selective damper system for a vibrating structure, said system comprising:
    a plurality of motion sensors for mounting to the structure, each sensor being arranged to generate a data signal indicative of local motion of the structure at its mounting position,
    a detector, responsive to the data signal from each of said sensors, including a modal matrix decomposition function for identifying a resonance modes of the structure from said data signals and, responsive to said identified resonance modes, an inverse modal matrix function for generating an appropriate control signal, and
    a plurality of mass dampers mechanically fixed to the structure and arranged to receive the control signals so as to generate forces tending to damp said resonances of the structure, said detector including a plurality of damping algorithm means coupled between the modal matrix decomposition function and the inverse modal matrix function, wherein at least one of the mass dampers comprises a mass supported from a housing that is fixed to the structure and a pair of electromagnets operable to move the mass in an axial direction to generate a reaction force substantially to oppose the vibration of the structure.

5. A selective damper system, as in claim 4, wherein a diaphragm arrangement supports the mass from the housing.

6. A selective damper system for a structure, comprising:
    a plurality of motion sensors for mounting to the structure, each sensor being arranged to generate a data signal indicative of local motion of the structure at its mounting position,
    a detector operably arranged to receive the data signal from each sensor and to generate at least one control signal in response to at least one resonance being generated in the structure, the detector comprising a modal matrix decomposition function arranged to identify at least one resonance mode of the structure from the data signals for generating a modal damping force demand value, and
    at least one mass damper for mechanically fixing to the structure and responsive to said force demand value so as to generate a force to damp said resonance of the structure.

7. A selective damper system, as in claim 6, including damping algorithm means coupled to receive the output of the modal matrix decomposition function.

8. A selective damper system for a hull of a marine vessel, comprising:
    a plurality of motion sensors mounted to the hull at spaced apart locations being arranged to generate a data signal indicative of local motion of the hull at its mounting position,
    a detector operably arranged to receive the data signal from each sensor and to generate a respective control signal in response to each of at least one resonance being generated in the hull, and
    a plurality of electromagnetic shakers mechanically mounted to the hull and arranged to receive the control signals so as to generate forces to damp resonant vibrations of the hull.

9. A selective damper system, as in claim 8, wherein the detector is arranged to determine a plurality of modes of resonance of the hull and to generate a respective control signal for each mode of resonance that has been detected.

10. A selective damper system, as in claim 9, wherein each of said plurality of electromagnetic shakers generates a force substantially to dampen each mode of resonance.

11. A selective damper system for a hull of a marine vessel, comprising:
    a plurality of motion sensors mounted to the hull at spaced apart locations being arranged to generate a data signal indicative of local motion of the hull at its mounting position,
    a detector operably arranged to receive the data signal from each sensor and to generate a respective control signal in response to each of at least one resonance being generated in the hull, and
    at least one mass damper mechanically mounted to the hull and arranged to receive the control signals so as to generate a force to damp the resonances of the hull, wherein the detector comprises a modal matrix composition function arranged to identify the resonance modes of the hull from the data signals and an inverse modal matrix function to general appropriate control signals dependent on each identified resonance mode.

12. A selective damper system as in claim 11, including a plurality of damping algorithms, for generating damping force demand values, coupled between said modal matrix composition function and said inverse modal matrix function.

13. A selective damper system for a hull of a marine vessel, comprising:
- a plurality of motion sensors mounted to the hull at spaced apart locations being arranged to generate a data signal indicative of local motion of the hull at its mounting position,
- a detector operably arranged to receive the data signal from each sensor and to generate a respective control signal in response to each of at least one resonance being generated in the hull, and
- at least one mass damper mechanically mounted to the hull and arranged to receive the control signals so as to generate a force to damp the resonances of the hull, wherein each said mass damper comprises a mass supported from a housing that is fixed to the structure and a pair of electromagnets operable to move the mass in an axial direction to generate a reaction force substantially to oppose the vibration of the structure.

14. A selective damper system, as in claim 13, wherein a diaphragm arrangement supports the mass from the housing.

15. In a structure, where vibration of the structure, which may excite resonant modes of vibration, is created by turbulent fluid flowing around the structure, a method of selectively damping said structure, comprising the steps of:
- mounting a plurality of motion sensors to the structure and generating from each motion sensor a data signal indicative of local motion of the sensor,
- subjecting the data signals to a modal matrix decomposition function that provides excitation signals identifying a plurality of resonance modes of the structure,
- applying each said excitation signal to a respective damping algorithm to generate a damping force demand value, and applying force demand values to an inverse modal matrix function to generate appropriate control signals dependent on each identified resonant mode, and
- applying the control signals to a plurality of electromagnetic shakers that are fixed to the structure to dampen the resonances of the structure.

16. A method of selectively damping a hull of a marine vessel, comprising:
- mounting a plurality of motion sensors to the hull and generating from each motion sensor a data signal indicative of local motion of the sensor,
- subjecting the data signals to a modal matrix decomposition function that provides an excitation signal identifying at least one resonance mode of the structure, and generating from the excitation signal a damping force demand value, and
- applying a control signal representative of said damping force demand value to at least one mass damper that is fixed to the structure to dampen the resonance of the structure.

* * * * *